Figure 6:
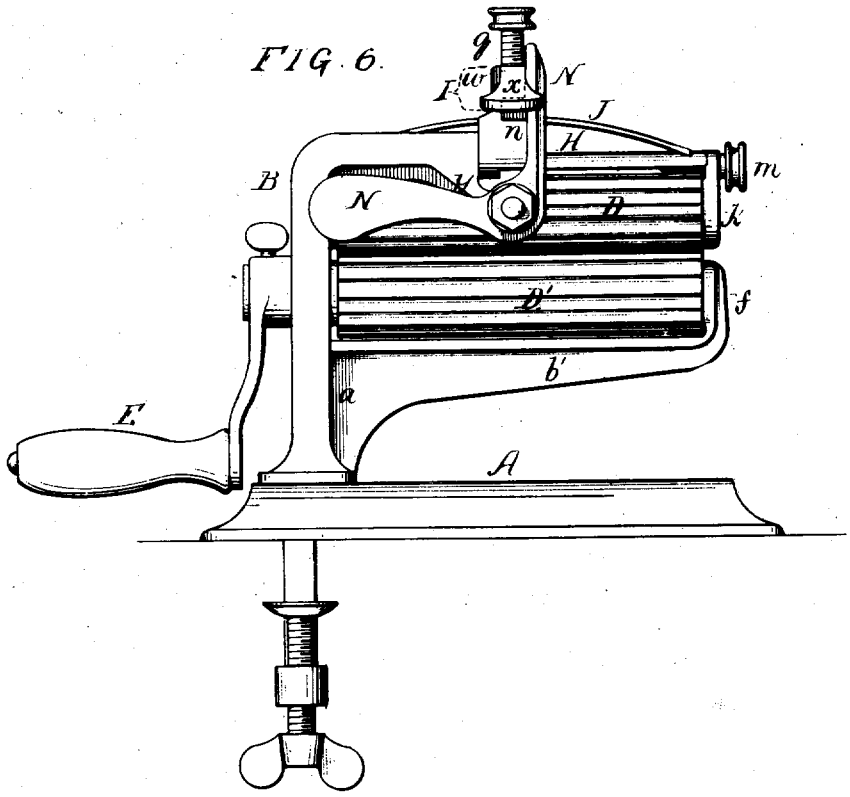

2 Sheets—Sheet 1.
H. ALBRECHT.
Fluting-Machines.
No. 9,127. Reissued Mar. 23, 1880.
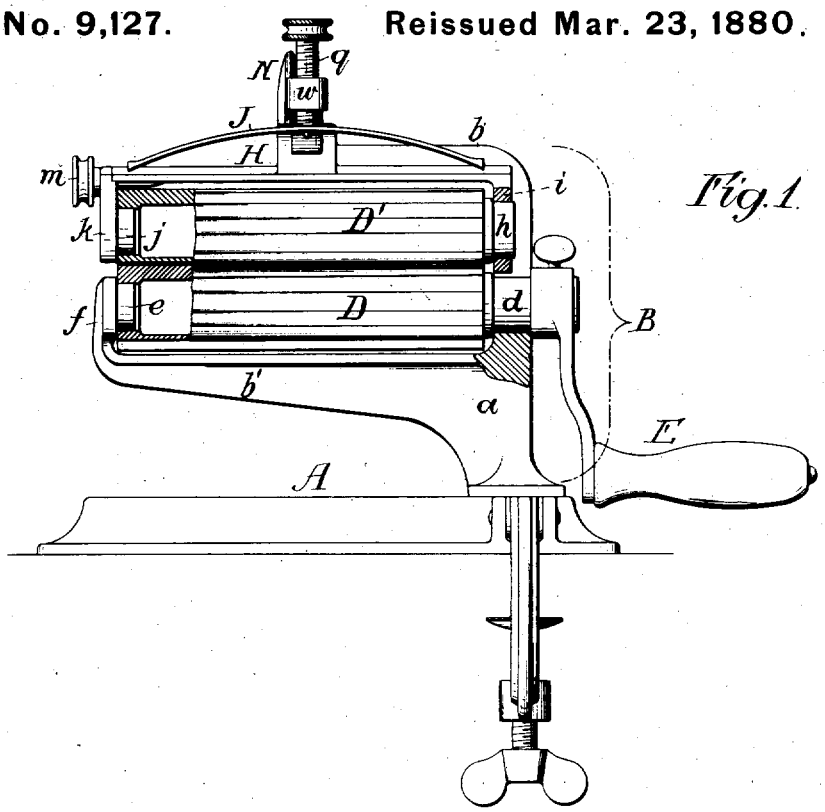
Fig. 1.
Fig. 2
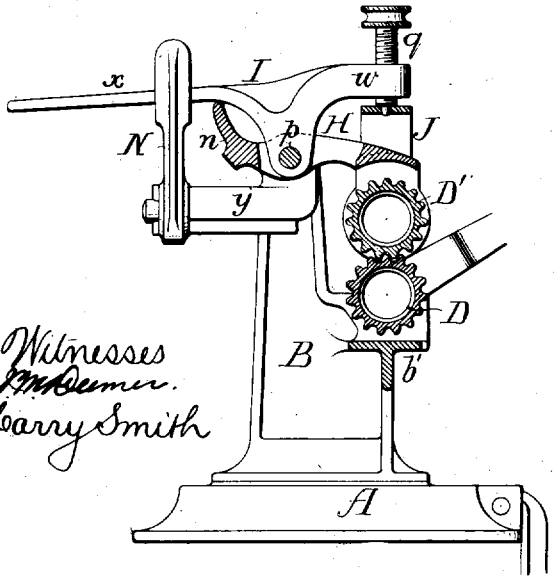
Fig. 3
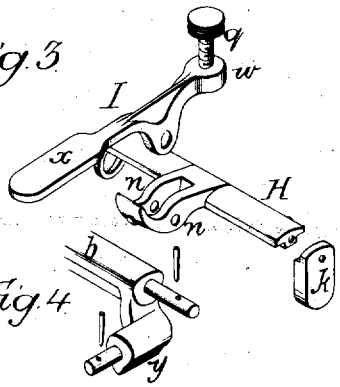
Fig. 4
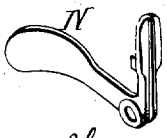
Fig. 5
Witnesses
[illegible]
Harry Smith
Inventor
Hermann Albrecht
by his Attorneys
Howson and Son 2 Sheets—Sheet 2.

H. ALBRECHT.
Fluting-Machines.

No. 9,127. Reissued Mar. 23, 1880.

WITNESSES
Harry Smith
Henry Howson Jr.

INVENTOR.
Hermann Albrecht
by his Attorneys—
Howson and Son

UNITED STATES PATENT OFFICE.

HERMANN ALBRECHT, OF PHILADELPHIA, PENNSYLVANIA.

FLUTING-MACHINE.

SPECIFICATION forming part of Reissued Letters Patent No. 9,127, dated March 23, 1880.

Original No. 169,327, dated November 2, 1875. Application for reissue filed January 12, 1880.

*To all whom it may concern:*

Be it known that I, HERMANN ALBRECHT, a citizen of the United States, residing in Philadelphia, Pennsylvania, have invented certain Improvements in Fluting-Machines, of which the following is a specification.

The objects of my invention are to so construct a fluting-machine as to permit one roller to be moved apart from the other without straining the pressure-spring, and to prevent the sudden and forcible contact of the adjustable roller with the fabric on releasing said adjustable roller.

The invention consists of the combination of a lever pivoted upon the fixed frame of the machine, a frame carrying one of the fluting-rollers and movable with but capable also of a limited movement independent of the lever, and a pressure-spring interposed between the said lever and movable frame.

The invention further consists of the combination of the fixed frame and its roller, the movable frame and its roller, the pivoted lever, the pressure-spring interposed between said lever and the movable frame, and a device whereby the lever may be locked to or released from the fixed frame, all as hereinafter more fully set forth.

In the accompanying drawings, Figure 1 is a front view, partly in section, of my improved crimping or fluting machine; Fig. 2, a vertical section; and Figs. 3, 4, and 5, perspective views of detached portions of the machine, Fig. 6, Sheet 2, being a rear view of the machine.

To the base A of the machine is secured the frame B, composed of the vertical portion *a* and the upper and lower arms, *b* and *b'*, the latter overhanging the base, so as to permit the free introduction between the said arm and base of the fabric to be crimped.

The journal *d* of the lower crimping-roller, D, has its inner bearing in the vertical portion *a* of the frame B, and is provided with a suitable handle, E, the outer bearing of the said roller being on a circular stud or projection, *e*, on the turned-up end *f* of the arm *b'*.

A frame, H, carries the upper fluting-roller, D', the inner journal, *h*, of which has its bearing in a projection, *i*, of the said frame, the outer bearing being on a circular projection, *j*, forming part of a plate, *k*, which is so attached by a set-screw, *m*, to the outer end of the frame H that it can be readily detached therefrom. From the frame H projects an arm, *n*, which is hung to a pin, *p*, on the arm *b* of the fixed frame B, and to the same pin is pivoted a lever, I, through the short arm *w* of which passes a screw, *q*, for bearing on a spring, J, and forcing the ends of the same onto the frame H.

When the machine is in use the pivoted lever I is locked by a catch on the vertical arm of the bell-crank lever N, which is hung to a pin on the projection *y* of the fixed arm *b*.

When the upper fluting-roller has to be raised the lever I must be unlocked by operating the bell-crank lever N, and the arm *x* of the said lever I may then be depressed, and as this arm bears on the outer end of the arm *n* of the frame H the latter, with the upper fluting-roller and spring J, must be elevated.

When the machine is adjusted for operation and the lever I is locked to the fixed frame by the lever N the fluted rollers are in contact with each other; but when the fabric is passed between them the upper roller will yield, as the only obstacle to the rising of the frame H is the spring J. Hence the pressure on the fabric passed between the rollers will depend on the adjustment of this spring by the screw *q*.

It will thus be seen that, while the frame H and lever I move together when said lever is released from the fixed frame, the frame H is capable of yielding independently of the lever I when the latter is locked to the fixed frame. By this means the movement of the roller D' away from the roller D in order to introduce or remove the fabric can be effected without compressing the pressure-spring J, owing to the fact that said spring moves with the roller. I thus overcome a serious objection to ordinary fluting-machines, in which the abutment of the pressure-spring is directly on the fixed frame, for in a machine of this class the separation of the movable roller from the roller having fixed bearings demands an inconvenient effort, owing to the resistance presented by the spring, the latter being at the same time impaired by repeated and excessive compression.

In ordinary fluting-machines, moreover, the fabric is often injured by the sudden and forcible contact of the adjustable roller with the said fabric, due to the recoil of the pressure-spring when the frame carrying the adjustable roller is released from confinement.

In my improved machine the depression of the upper roller, D, onto the fabric after the latter has been introduced into the machine is effected by the manipulation of the lever I, so that all injury to the said fabric due to the sudden and forcible contact of the roller D′ with the same is obviated.

It will be understood that the fluting-rollers are, as usual, made hollow for the reception of heated irons.

I claim as my invention—

1. The combination, in a fluting-machine, of a lever pivoted upon the fixed frame of the machine, a frame carrying one of the fluting-rollers and movable with the lever, but capable also of a limited movement independently thereof, and a pressure-spring interposed between the said lever and the said movable frame, substantially as and for the purpose specified.

2. The combination of the fixed frame of a fluting-machine and a roller having its bearings therein with a movable frame carrying the other roller, a lever pivoted upon the fixed frame, a pressure-spring interposed between the said lever and said movable frame, and a device whereby the said lever may be locked to or released from the fixed frame, all substantially as set forth.

3. The combination of the frame B, the roller D, adapted to bearings therein, the pivoted frame H, carrying the roller D′, and having an arm, *n*, the spring J, the lever I, and a device for retaining and releasing said lever, as specified.

In testimony whereof I have signed my name to this specification in the presence of two subscribing witnesses.

HERMANN ALBRECHT.

Witnesses:

JAMES F. TOBIN,

HARRY SMITH.